(12) United States Patent
Corker et al.

(10) Patent No.: US 10,870,530 B2
(45) Date of Patent: Dec. 22, 2020

(54) DISPENSING APPARATUS AND CAPSULE FOR USE THEREWITH

(71) Applicant: SABMILLER PLC, Surrey (GB)

(72) Inventors: Richard Corker, Surrey (GB); Wolfgang Tosch, Surrey (GB); Andrew Chapman, Cambridgeshire (GB); Daniel Longman, Leicestershire (GB); Duncan Shea-Simonds, Leicestershire (GB); David Mason, Leicestershire (GB)

(73) Assignee: SABMILLER PLC

( * ) Notice: Subject to any disclaimer, the term of this patent is extended or adjusted under 35 U.S.C. 154(b) by 461 days.

(21) Appl. No.: 15/029,757

(22) PCT Filed: Oct. 16, 2014

(86) PCT No.: PCT/GB2014/053114
§ 371 (c)(1),
(2) Date: Apr. 15, 2016

(87) PCT Pub. No.: WO2015/056022
PCT Pub. Date: Apr. 23, 2015

(65) Prior Publication Data
US 2016/0244248 A1 Aug. 25, 2016

(30) Foreign Application Priority Data

Oct. 16, 2013 (GB) .................................. 1318315.7
Jun. 20, 2014 (GB) .................................. 1411069.6

(51) Int. Cl.
*B65D 85/804* (2006.01)
*A47J 31/40* (2006.01)
*A47J 31/06* (2006.01)

(52) U.S. Cl.
CPC ...... *B65D 85/8043* (2013.01); *A47J 31/0673* (2013.01); *A47J 31/407* (2013.01)

(58) Field of Classification Search
CPC .. A47J 31/0673; A47J 31/407; B65D 85/8043
(Continued)

(56) References Cited

U.S. PATENT DOCUMENTS 2,745,403 A * 5/1956 Goldberg ................ A61M 5/24
604/206
3,084,688 A * 4/1963 McConnaugh ......... A61M 5/24
604/232

(Continued)

FOREIGN PATENT DOCUMENTS

EP 0716031 B1 4/1999
EP 2465792 A2 6/2012
(Continued)

OTHER PUBLICATIONS

GB Search Report for Application GB1318315.7, dated Feb. 26, 2014, Intellectual Property Office, UK.
(Continued)

*Primary Examiner* — Ibrahime A Abraham
*Assistant Examiner* — Kuangyue Chen
(74) *Attorney, Agent, or Firm* — McDonald Hopkins LLC

(57) ABSTRACT

According to the invention there is provided a capsule (1) for delivering flavouring to a beverage, the capsule (1) defining a closed internal volume (20) containing a flavouring for a beverage, the capsule comprising at least two frangible regions (30, 40), and a piercing member (50) housed within the internal volume (20), the piercing member (50) adapted to pierce at least one of said frangible regions (30, 40) of the capsule (1). Also according to the invention, there is provided a dispensing apparatus (100) for dispensing flavouring to a beverage, the apparatus comprising a mount (110) for (Continued)

receiving a capsule (1) containing flavouring to be added to the beverage, and an engaging portion (80) configured to engage with a piercing member (50) within a capsule (1) and pierce a frangible region of the capsule (1), wherein the apparatus (100) is configured to provide relative movement of the mount (110) and engaging portion (80) between a retracted position and an engaged position in which the engaging portion (80) is configured to engage with the piercing member (50) in the capsule (1).

16 Claims, 6 Drawing Sheets

(58) Field of Classification Search
USPC .......................................................... 99/295
See application file for complete search history.

(56) References Cited

U.S. PATENT DOCUMENTS

| | | | | |
|---|---|---|---|---|
| 4,425,122 | A * | 1/1984 | Cohen | A61M 5/34 604/237 |
| 6,659,308 | B1 * | 12/2003 | Kelder | B65D 51/226 222/494 |
| 8,522,669 | B1 | 9/2013 | Rolfes | |
| 8,887,905 | B2 * | 11/2014 | Muhlemann | B65D 51/2835 206/219 |
| 2004/0015148 | A1 * | 1/2004 | Curutcharry | A61J 1/2089 604/414 |
| 2004/0115317 | A1 | 6/2004 | Doglioni | |
| 2007/0293819 | A1 * | 12/2007 | Giambattista | A61M 5/3202 604/110 |
| 2008/0097338 | A1 * | 4/2008 | Cheng | A61M 5/24 604/201 |
| 2009/0117249 | A1 | 5/2009 | Ozanne | |
| 2012/0276255 | A1 | 11/2012 | Verbeek | |
| 2014/0053735 | A1 | 2/2014 | Verbeek | |
| 2014/0150616 | A1 | 6/2014 | Zanetti | |

FOREIGN PATENT DOCUMENTS

| | | | | |
|---|---|---|---|---|
| EP | 2374733 | B1 | 10/2012 | |
| WO | WO 02081337 | A1 * | 10/2002 | .......... A47J 31/0673 |
| WO | WO 2007134960 | A1 * | 11/2007 | .......... A47J 31/3628 |

OTHER PUBLICATIONS

GB Search Report for Application GB1318315.7, dated Jun. 20, 2014, Intellectual Property Office, UK.
Patent Cooperation Treaty (PCT) International Search Report for Application PCT/GB2014/053114, dated Mar. 9, 2015, European Patent Office, NL.

* cited by examiner

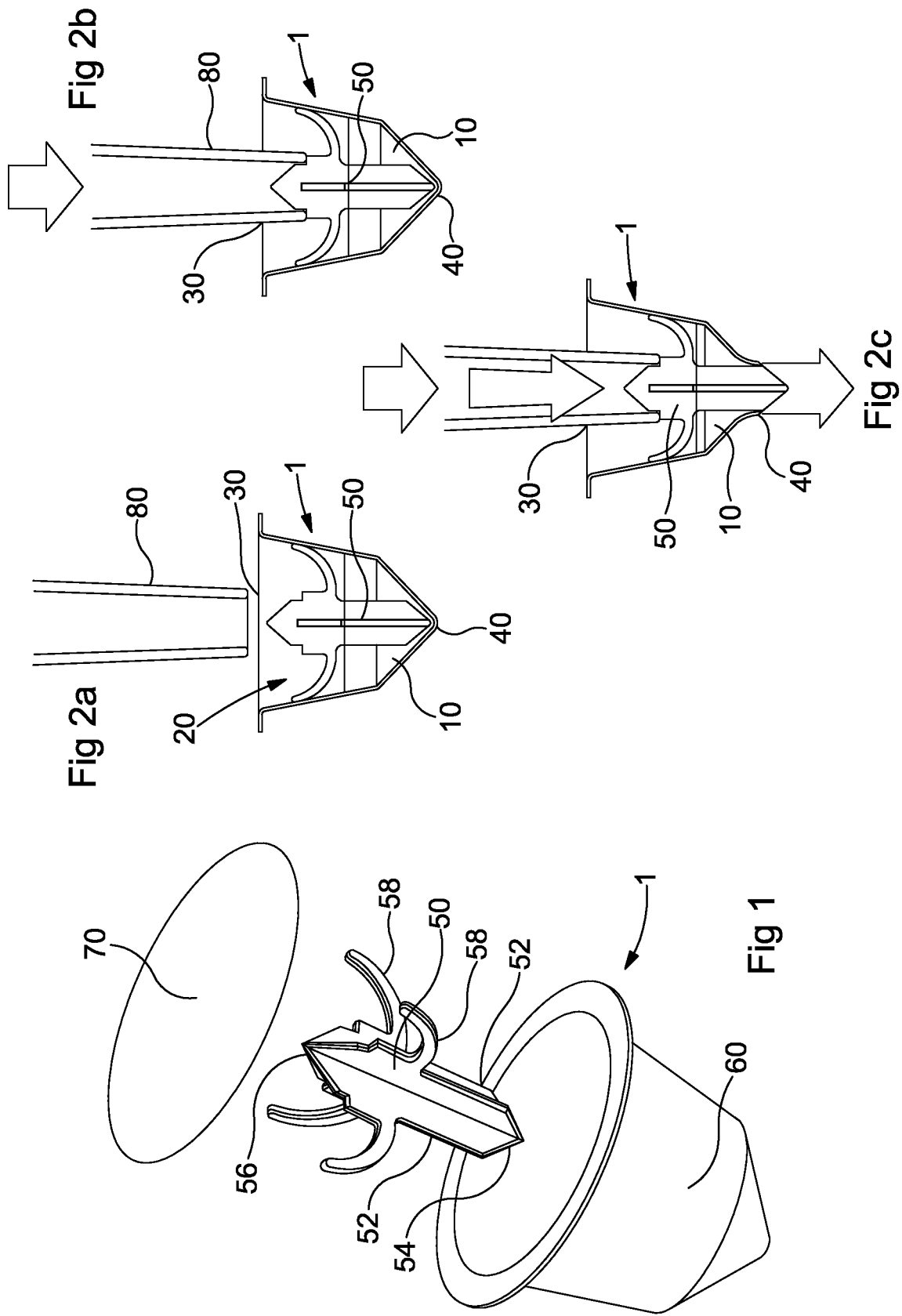

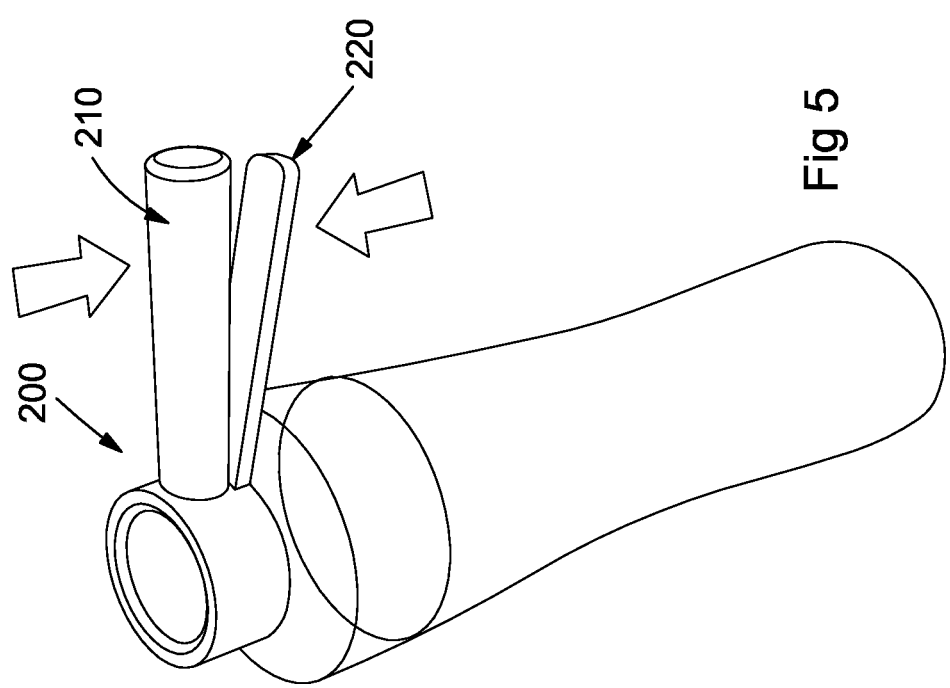

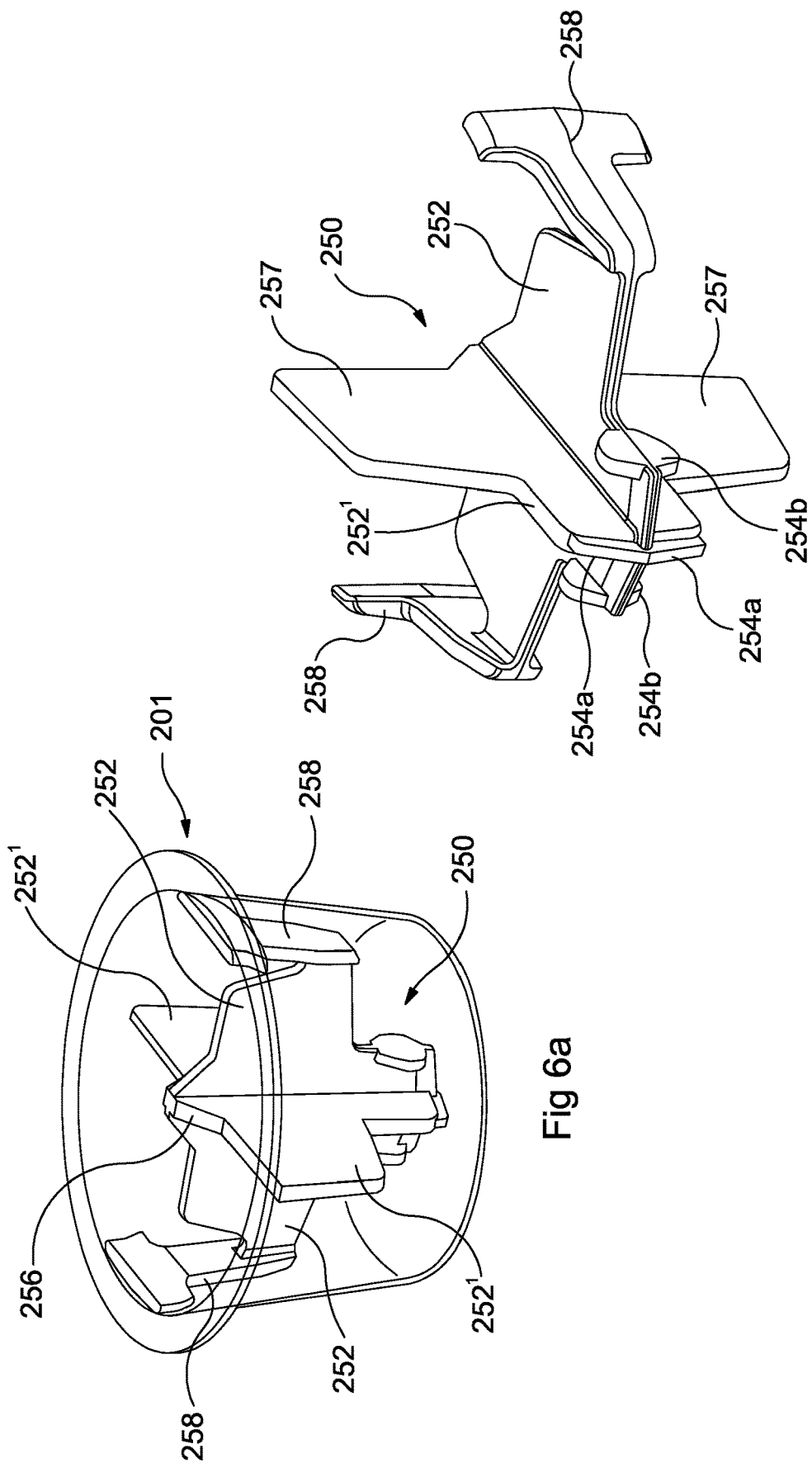

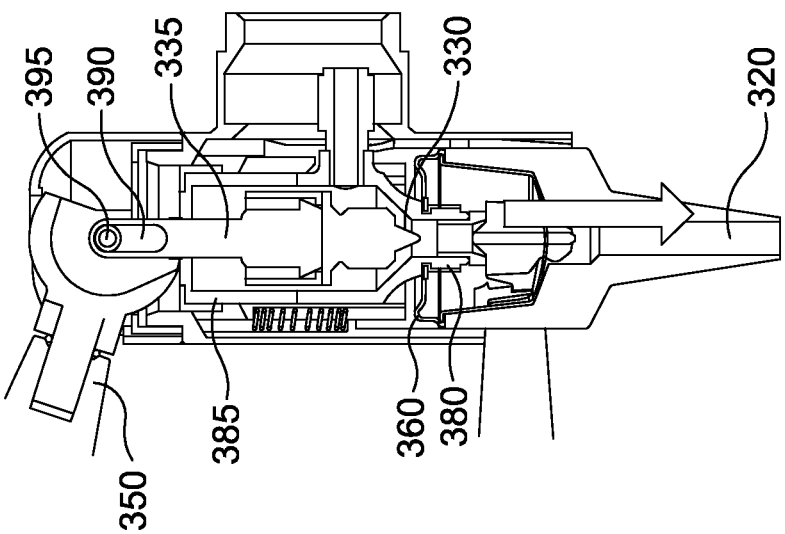
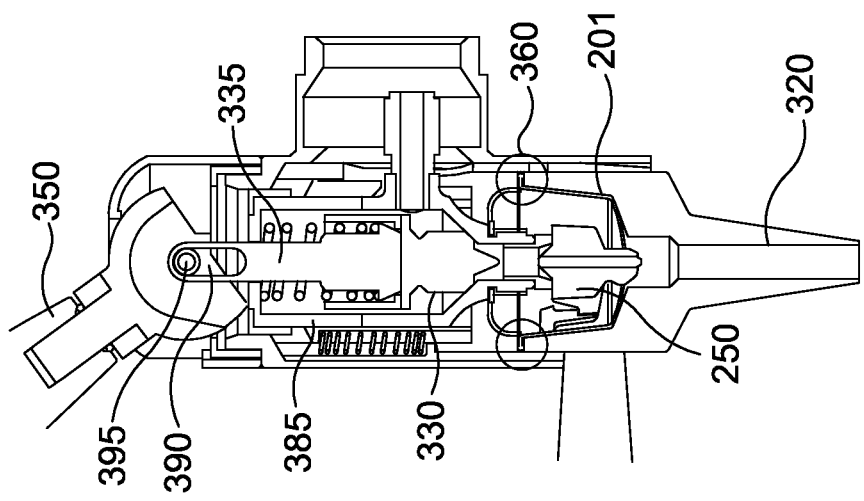
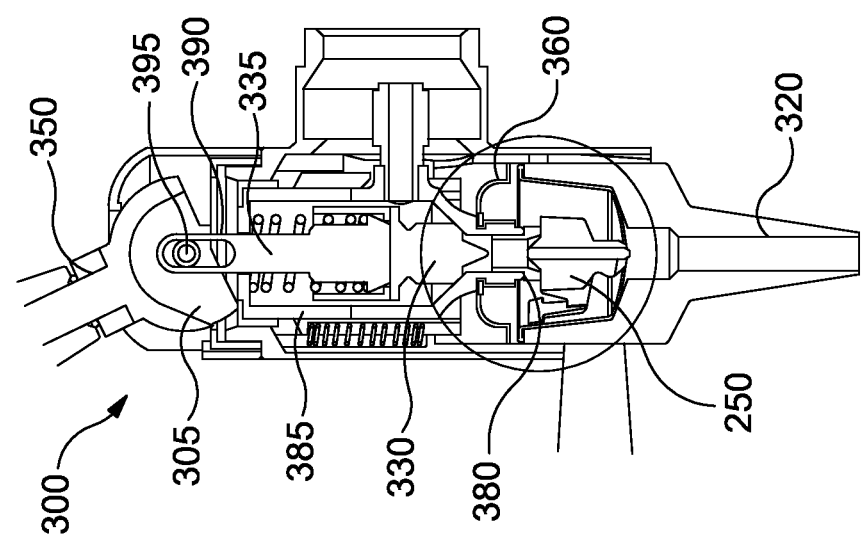

DISPENSING APPARATUS AND CAPSULE FOR USE THEREWITH

CROSS REFERENCE TO RELATED APPLICATIONS

This application is a 35 U.S.C. 371 national stage filing and claims priority to International Application No. PCT/GB2014/053114 filed on Oct. 16, 2014, entitled "Dispensing Apparatus And Capsule For Use Therewith," which claims the benefit of British Patent Application Nos. 1411069.6 filed on Jun. 20, 2014 and 1318315.7 filed on Oct. 16, 2013, each of which is incorporated herein in its entirety by reference.

FIELD OF THE INVENTION

The present invention relates to a dispensing apparatus and also to a capsule for use in a dispensing apparatus.

BACKGROUND OF THE INVENTION

It is known to manually flavour beverages with flavourings. Such flavourings may be poured into a beverage, or flavours may be infused into the beverage. However, it is difficult to obtain exact dosing of a beverage in this manner. Further, attempts to achieve uniform doses can result in spillage of the flavourings and contamination between different flavourings.

The present invention has been made to overcome or ameliorate at least one of the problems associated with the prior art, or provide a useful alternative.

SUMMARY OF THE INVENTION

According to a first aspect of the invention, there is provided a capsule for delivering one or more flavour additives to a beverage. The flavouring may be a naturally occurring flavouring, and may include, for example, botanical extracts to impart a different flavour to the beverage. In an embodiment, the capsule defines a closed internal volume which contains a flavouring additive for a beverage. Such a closed capsule keeps the flavouring fresh, allows a predetermined amount of flavouring to be added to a beverage, and can help to prevent cross-contamination between different flavourings that may be used for beverages. The flavouring may include liquid flavouring with or without an inert gaseous environment provided therein. Alternatively, the flavouring may be a solid, which may be retained in a porous or perforated bag/lining or other retaining device to retain the flavouring material within the capsule. Again, an inert gaseous environment may be provided. In an alternative embodiment, both solid and liquid flavourings may be provided together. This is particularly useful where the flavouring is small particles or where the flavouring material may easily break into such small particles. The solid material may be a hop cone, for example.

The flavouring material may be retained in the capsule, and impart flavour to the beverage as the beverage passes through the capsule. In an aspect, the capsule is provided with two frangible regions. This provides both an entry point and exit point for the liquid or beverage that is to be flavoured. Alternatively, more than one of each or either of the entry and/or exit frangible regions may be provided.

In an aspect, the capsule includes a piercing member housed within the internal volume, the piercing member adapted to pierce at least one of said frangible regions of the capsule. In aspects of the invention, the piercing member is completely contained within the capsule, and in aspects of the invention is not connected thereto at all, but, rather, is loose within the capsule. If only one frangible region is broken with the piercing member, the other may be broken with an external member. The external member may interact with the piercing member to cause it to break a frangible region. In this way, the piercing member inside the capsule can be used to break the capsule and allow the liquid to be flavoured into the capsule as well as allowing the so flavoured beverage to flow out from the capsule without application of high pressure to the liquid/beverage. The piercing member may be a separate part i.e. free from attachment to the capsule itself, but contained inside the capsule, rather than being attached to the capsule or formed as a part of a body or lid.

In one embodiment, the liquid/beverage may be at substantially atmospheric pressure as it flows into the capsule. Alternatively, the liquid/beverage may be at 1.1, 1.2, 1.3, 1.4, 1.5, 1.6, 1.7, 1.8, 1.9 or 2.0 bar for example, although any of these figures could form a range of pressures, or an upper or lower limit of a range of values.

By providing a mechanical breaking mechanism for the capsule, significantly lower pressures can be applied to the capsule while still delivering the mixing required of the liquid/beverage and flavouring. In aspects of the invention, the beverage is beer or lager, and the flavour is liquid, for example a botanical additive, which is to be mixed with the beer to provide additional flavour thereto.

In an aspect, the capsule is formed from a body and a closure which may be in the form of a lid. The body may be formed from moulded plastic. The body may form a blind hollow or recess, into which the flavouring is placed, together with the piercing member, before the lid is sealed to the opening in the body to form the closed capsule. The lid may be formed from foil, which may be aluminium, or another metal, or non-metallic foil. The body may comprise a frangible region or portion and the lid may also comprise a frangible region or portion, which may comprise a part of or the entire lid.

The piercing member may be configured to pierce the body and/or the lid. This may be actuated by an external member, which may be in the form of an engaging portion, which is pressed into the capsule, for example into the lid, and cooperates with the piercing member inside the capsule to break the lid. The piercing member may comprise at least one shoulder region configured to receive and engage with the engaging portion, which may be a nozzle. In use, the engaging portion may then push the piercing member further into the recess of the body until the piercing member breaks the frangible region of the body and allows the flavouring to flow out thereof. The liquid/beverage may then flow through the capsule, mixing with the flavouring and having flavour imparted thereto or washing the flavouring out of the capsule in the liquid flow. In aspects of the invention, the liquid or liquid and flavouring can flow out of the body through the break therein while the piercing member is in situ in the region of the breakage. In aspects of the invention, the piercing member extends partially out of the capsule when it pierces the capsule. In this way, the piercing member need not be retracted back into the body before the liquid can flow through the capsule.

When the piercing member pierces the body, the flavouring material may be able to flow out of the body past the piercing member while the piercing member extends partially out of the body through the frangible region. In order to achieve this, the piercing member, in cross section, may define regions of relatively larger and reduced radial extent. Alternatively, the piercing member may comprise a hollow tube, or perforated or lattice structure. The piercing member may have a substantially x-shaped cross section, with four ribs extending from a central spine of the piercing member in cross-section. In this way, the tip of the piercing member may act to break the frangible region, and the extremities of the "x" section then expand the hole, while the radially recessed portions there between allow the liquid and flavouring to flow out of the capsule without retraction of the piercing member. Instead of 4 extending ribs in cross-section, another number of ribs may be provided, for example 2, 3, 5, 6, 7 or 8, or more or the prongs may not be two pairs of diametrically opposed prongs.

The piercing member may comprise a central elongate core, spine or shaft, and a plurality of longitudinal ribs may extend therefrom along at least part of the length of the core. The ribs may extend substantially radially away from the core. The ribs may extend from the core along at least half of the length of the core. They may extend along the whole length of the core. An end of the piercing member may comprise one or more flanges for enlarging a hole formed by the piercing member on piercing of the frangible region of the capsule. These flanges may extend from the radially outer end of respective ribs, in the region of the end of the piercing member, substantially perpendicularly to the radial extent of the rib from the end distal to the central shaft or core. The flanges may extend partially along the length of the ribs, or the along the whole length of the ribs. The flanges may be rounded on their leading edges (ie those towards the end of the piercing member).

The piercing member may comprise a plurality of locating braces. These may extend laterally away from a longitudinal axis extending between the ends of the piercing member. These locating braces may be conveniently dimensioned so that they abut the internal surface of the body, and locate the piercing member within the body in a predetermined location, for example with the opposing ends at or adjacent respective frangible regions of the capsule. The locating braces may each extend from one of the four ribs. The braces may extend only laterally, ie substantially perpendicularly to the longitudinal direction of the piercing member, or may be bent. The braces may be rigid or resilient. If resilient, the braces may provide biasing force of the piercing member away from the hole made by the piercing member after the engaging portion is removed from engagement with the piercing member. In this way, on disposal of the capsule, the piercing member does not protrude. The braces may therefore provide a self-centering and/or self-sprung piercing member inside the capsule.

The frangible region of the body of the capsule may be pointed, so that one end of the piercing member sits and is located in or adjacent the point. In this case, the locating braces may be arranged towards the opposing end of the piercing member, for example to maintain that end of the piercing member in a central region under the lid. In this way, the relative positioning of the external engaging portion and the piercing member can be aligned without visibility of the position of the piercing member inside the capsule. One or more locating regions, which may be shoulders, may be provided on the piercing member for engaging with the engaging portion. The engaging portion may be an outlet nozzle. In this way, the liquid can be dispensed from the nozzle, which also acts with the piercing member to break the frangible regions of the capsule and allow liquid flow there through.

In an aspect of the invention, there is provided a dispensing apparatus for dispensing beverage and selectively adding flavouring thereto. The apparatus may comprise a mount for receiving a capsule containing flavouring to be added to the beverage. The apparatus may also comprise an engaging portion configured to engage with a piercing member within a capsule and pierce a frangible region of the capsule. As discussed above, the engaging portion may be an outlet nozzle of a liquid dispenser, for example a nozzle of a font of a beer/lager dispenser. The liquid dispensed may be chilled, or at ambient temperature. The liquid may be carbonated.

The apparatus may be configured to provide relative movement between the mount and engaging portion between a retracted position, and an engaged position in which the engaging portion is configured to engage with the piercing member in the capsule. In this way, the capsule may be placed in the mount, and the mount or nozzle moved so that the nozzle cooperates with the piercing member and breaks one frangible region of the capsule (for example in the lid), another frangible region of the capsule (for example in the body) may then be broken by relative motion of the nozzle and piercing member, relative to the capsule, to force the piercing member through the capsule and form a second opening. The two regions may be broken at the same time, or may be broken sequentially as the relative movement between the nozzle and mount occurs. The mount may be static and the nozzle may move relative to the rest of the apparatus, or vice versa.

The apparatus may include a valve for controlling the flow and dispense rate of the beverage, and may also comprise a tap for controlling the valve. The tap may simultaneously or sequentially also control the relative movement of the mount and nozzle. Alternatively, the apparatus may be retrofittable to and/or removable from an existing tap and nozzle, for example to a font of a beer dispenser.

The mount may comprise a through hole, which is restricted at one end to retain a capsule within the through hole, while allowing beverage to flow there through. The mount may therefore maintain the capsule in position in the apparatus, while allowing relative movement of the engaging portion to the capsule in a predetermined relative position and orientation of the capsule, to ensure that the engaging portion engages the piercing member and the capsule is opened as described above. The mount may comprise a substantially cylindrical receiving orifice, which is partially closed at the base, while leaving a relatively small opening at the axial centre of the cylinder at the base, through which the beverage can flow, while being open at the top to receive and allow removal of the capsule and to allow the engaging portion to engage with the capsule. The restriction in the mount at the base provides a retaining portion on which a capsule placed in the mount rests. In aspects of the invention, this restriction is provided as a radially inwardly extending shoulder, while providing an exit flow path for beverage that flows through the capsule and out of the dispenser. In aspects of the invention, if a capsule is not provided in the apparatus, it will dispense beverage. The flow path is through the region where the mount is held in the apparatus, and the mount may be in situ as dispensing occurs. Thus the apparatus functions to dispense beverage whether a capsule is provided in the mount or not. In aspects of the invention, the mount is connected to the dispenser after the last point in the flow path of the dispenser. In other words, the dispenser may dispense beverage directly from the hole in the base of the mount when it is connected to the dispenser. When the mount is not connected, the dispenser dispenses directly from the engaging portion, which engages with a capsule when one is provided. Alternatively, there may be a downstream passage, in an in-use downstream position in the dispensing apparatus from the position in the mount that the capsule is provided. The downstream passage may serve to guide and provide a final dispensing point for the beverage whether or not a mount, and capsule, is provided in the dispensing apparatus.

The apparatus may comprise a nozzle body and a valve body. A valve may be mounted on the valve body and act on the nozzle body to close a fluid flow path through the nozzle body. The valve may be biased into closing the fluid flow path. The valve may be biased by a spring. The apparatus may comprise a handle which acts on the nozzle body to cause the nozzle body to move downwards. The handle may comprise a cam surface to act on the nozzle body. The nozzle body may be biased towards a position away from a capsule receiving space, and may be biased by a spring. The valve body may be mounted to the handle via a groove on the valve body, which cooperates with a pin on the handle, or vice versa. The groove and pin may allow a predetermined amount of movement of the nozzle body and valve body together with a predetermined degree of movement of the handle. Further movement of the handle beyond this predetermined degree of movement may cause the nozzle body and valve body to move relative to one another and cause the valve to open.

In aspects of the invention, the apparatus is operated by rotating a handle about a pivot point. In embodiments, a first rotational amount of the handle causes the nozzle to move downwards into a capsule, while the valve remains closed. A second, greater, rotational amount causes the cap to engage with the outer surface of the capsule, to form a seal, while further moving the nozzle downwards into the capsule, and a third, yet greater, rotation of the handle causes a valve in the apparatus to open and liquid to be dispensed through the apparatus, through a capsule mounted in the apparatus and to be flavoured before being dispensed. The third rotation may also cause further downward movement of the nozzle. In one embodiment, piercing of the capsule happens during the first part of the movement, before a complete seal is made on the top of the capsule to prevent pressure build up within the volume between the (flexible) seal and the capsule as the nozzle body move down. The valve is opened last, after both the top and bottom of the capsule are pierced by the piercing member and the seal is made, as any restriction and subsequent pressure change when liquid is present could otherwise cause turbulence and foaming during dispensing of the liquid beverage.

In a further aspect of the invention, the mount and engaging portion described above may not be mounted on a separate beverage dispensing apparatus, but may be provided as part of a self-dispensing apparatus. In this case, the mount and engaging portion may be pivotably mounted to one another and movable between an open position, in which a capsule can be placed in the mount, and an engaged position, in which the engaging portion is brought into contact with the capsule, is pushed into engagement with the capsule as described above, and causes the frangible portions to be broken as discussed above. In this way, the contents of the capsule can be dispensed on their own, for example into a glass of beer, without dispensing the beverage through the capsule.

BRIEF DESCRIPTION OF THE DRAWINGS

Embodiments of the invention will now be described, purely by way of example, with reference to the accompanying drawings, in which:

FIG. 1 shows an exploded view of a capsule according to an embodiment of the invention;

FIG. 2a shows a cross section through a capsule according to an embodiment of the invention, together with an engaging portion in the form of a nozzle;

FIG. 2b shows a cross section through the capsule of FIG. 2a, with the nozzle entering the capsule;

FIG. 2c shows a cross section through the capsule of FIGS. 2a and 2b, with the nozzle pushing a piercing member through an opposing side of the capsule;

FIG. 5 shows an apparatus according to a further embodiment of the invention;

FIG. 6 shows a piercing member according to a further embodiment of the invention; and FIGS. 7 and 8 show a dispensing apparatus according to a further embodiment of the invention.

DETAILED DESCRIPTION OF EMBODIMENTS OF THE INVENTION

Figure 3:
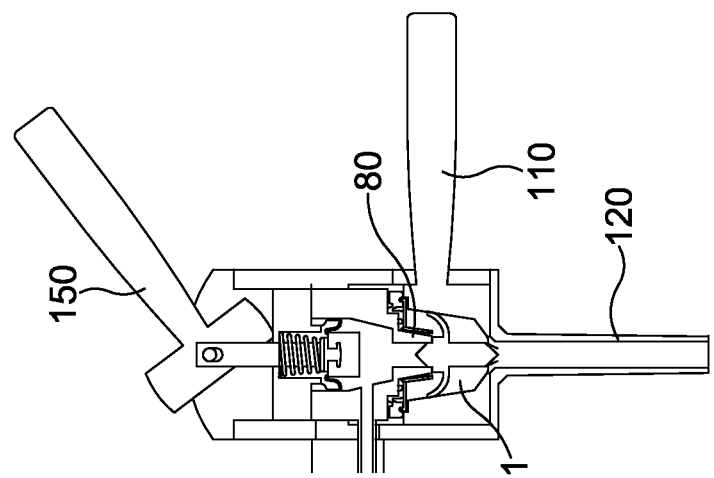
FIG. 3 shows a dispensing apparatus according to an embodiment of the invention in a first configuration.

FIGS. 1 and 2a-2c show a capsule 1 for delivering flavouring 10 to a beverage. The capsule 1 defines a closed internal volume 20 containing a flavouring 10 for a beverage. The capsule comprises at least two frangible regions 30, 40. The capsule also comprises a piercing member 50 housed within the internal volume 20. The piercing member 50 is configured to pierce at least one of the frangible regions 30, 40 of the capsule 1. In the present embodiment, the piercing member 50 is not connected to or mounted within the capsule 1, but is a separate and free part.

The capsule 1 includes a body 60 defining a blind recess and one of said frangible regions 40. In the present embodiment, the body 60 is symmetrical around an axis running from a base of the body 60 to the centre of the open top of the body 60. In the present embodiment, the sides of the body 60 (extending between the base and the open top) have a shallow draft, tapering towards the base. The frangible region 40 is included in the base of the capsule, at the bottom of the blind recess.

The base of the body 60 is tapered to a point, and in the present embodiment is substantially conical, so that a pointed end of the piercing member 50 sits therein and is kept in position by the shape of the base of the body 60. The taper on the end of the piercing member 50 is, in the present embodiment, larger than the taper of the base. In alternative embodiments, the base may be flat or substantially flat, and the piercing member may be glued thereto, or retained by upraised portions etc. The body 60 is formed from moulded plastic in the present embodiment, but could alternatively be formed from other suitable materials. The body may be metallised plastic. Alternatively, the body may be formed from composite or laminated materials, such as laminated layers of aluminium and polypropylene for example. The capsule 1 is closed, once the piercing member 50 and the flavouring 10 are placed therein, by sealing a lid 70 across the open portion of the body 60 to form the closed internal volume 20. The lid 70 is formed from aluminium foil in the present embodiment, but alternative materials could also be used. The piercing member 50 is an elongate shaft, having a substantially "x"-shaped cross section along its length. Put in another way, an axially central spine of the member 50 is flanked by longitudinal ribs 52. In the present embodiment, four ribs 52 are provided as two opposing pairs. However, in other embodiments, more or fewer ribs could be used. Each end 54, 56 of the member 50 is tapered to form a piercing pointed region. The central spine could, in an alternative embodiment, be formed from a hollow tube instead of being solid, in addition to having the longitudinal ribs.

In the present embodiment, four locating braces 58 are formed. Each locating brace 58 extends from a respective rib 52 at around a central region in the longitudinal direction of the member 50. The braces 58 extend laterally where they join with the ribs 52 and are bent along their length towards one of the ends 56 of the member 50. The braces 58 are resilient in the present embodiment, although in alternative embodiments, they may be rigid. The braces 58 are dimensioned in length so that they extend to the sides of the body 60 of the capsule 1 and maintain the member 50 along the central longitudinal axis of the body 60. In this way, the position of the second end 56 in the body can be maintained. The braces 58 are also the same width as the ribs 52, so as to minimise the resistance to beverage flow through the capsule 1.

Although not shown in the present embodiment, in alternative embodiments, a membrane may be placed across the capsule, which may act to separate two different flavouring ingredients, for example which have a short shelf life if mixed prior to dispensing.

In use, as shown in FIG. 2a, the capsule 1 is mounted relative to an engaging portion in the form of a nozzle 80, as described in greater detail below. The nozzle 80 is positioned along the central longitudinal axis of the capsule 1 and then the foil lid 70 of the capsule is offered up to the nozzle 80, which is moved towards the capsule along that axis until, in cooperation with the piercing member 50, it breaks the frangible portion 30 of the lid 70. As shown in FIG. 2b, the nozzle 80 then enters into the capsule 1, and the end 56 of the piercing member 50 enters into the nozzle 80, the annular end surface of which sits on a plurality of shoulders on the piercing member 50. One shoulder is formed at a joining region between each rib 52 and the respective brace 58. The shoulders locate the nozzle 80 on the piercing member 50.

As the nozzle 80 is further depressed into the capsule 1, as shown in FIG. 2c, the end 54 of the piercing member 50 distal to the nozzle 80 is pushed downwards to the base of the body 60 and causes the frangible portion 40 of the body 60 to break. The braces 58 abut against the sides of the capsule 1, keeping the piercing member 50 located longitudinally within the capsule 1. Further as the sides of the body 60 of the capsule 1 are tapered towards the base, as the braces move down, they are restorative upward force is applied on the braces by the sides of the capsule, against which the nozzle 80 acts. The spaces between the ribs 52 then allow the flavouring 10 in the capsule 1, which in the present embodiment is a liquid, to exit the capsule 1.

The beverage, which in the present embodiment is beer, is then dispensed through the nozzle 80, through the capsule 1, passing between the ribs 52, and out from the broken base of the capsule 1 in the same way as the flavouring 10. In this way, cross contamination of flavourings 10 can be avoided where different capsules with different flavourings are used, as no external device is used to break the downstream side of the capsule (i.e. the base, through which the flavouring 10 flows). The flavouring 10 initially exits the capsule 1 by gravity feed alone, but then the capsule 1 acts as a mixing chamber for remaining flavouring, together with the beverage. Further, as high pressure flow of the beverage to be flavoured is not needed in the activation of the capsule 1, the beverage can be dispensed smoothly. The shaping of the ribs 52 also ensures smooth flow of the beverage through the capsule 1. Thus, foaming of the beverage during dispense can be avoided as the flow path is a straight path from the top of the capsule 1 to the base of the body 60 and there through, the beverage can be dispensed at normal dispensing pressures, and avoids creating turbulence by the shape of the piercing member 50. As the beverage is dispensed, the piercing member 50 protrudes through the broken frangible region 40 of the body 60. Once the dispensing is completed, the nozzle 80 is raised, again along the central longitudinal axis, and is removed from the capsule 1. The braces 58 of the piercing member 50, no longer being pushed down into the capsule 1, are pushed back up by the sides of the body so at least partially retracting the end 54 of the piercing member 50 back into the capsule 1.

Figure 4:
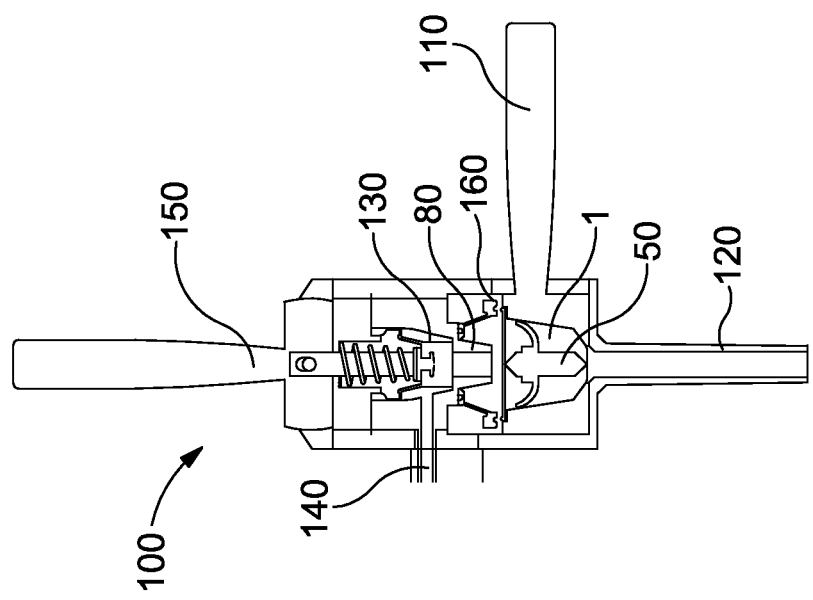
FIG. 4 shows the dispensing apparatus of FIG. 3 in a second configuration.

In a further embodiment of the invention, as shown in FIGS. 3 and 4, a dispensing apparatus 100 for dispensing beverage and selectively adding flavouring thereto includes a mount in the form of a removable receiving cradle and handle or portafilter 110 for receiving a capsule 1 containing flavouring to be added to the beverage. The mount or portafilter 110 has a receiving cradle for receiving a capsule 1 and a handle for holding the mount and placing it in the apparatus 100. The mount 110 is removably fixable to the apparatus 100. The receiving cradle has an opening in a top thereof for receiving the capsule 1, and sides generally of corresponding shape to the sides of the capsule 1. The base of the cradle is similarly correspondingly shaped to the base of the capsule 1, and has a central through hole at the base thereof. This through hole is sufficiently sized to allow flow of the flavouring and the beverage without the inside of the cradle being contaminated by liquid flow. The apparatus 100 also includes an engaging portion in the form of a nozzle 80. The nozzle is moveable along a longitudinal axis towards and away from the capsule 1, between a retracted position and an engaged position in which the nozzle 80 is configured to engage with the piercing member 50 in the capsule 1. The capsule 1 is positioned in the cradle with the top of the capsule 1 orientated upwards facing towards the nozzle, as described above. The apparatus 100 also includes a dispensing outlet 120 downstream of the capsule 1 in the beverage flow path, although this could alternatively be omitted. A valve 130 is provided to control the beverage flow through the apparatus 100, from an inlet port 140, through the nozzle 80, the capsule 1 and the outlet 120. The valve 130 is controlled by a tap 150, which is operable to both open the valve 130 and move the nozzle 80 to engage with the piercing member 50 in the capsule 1 mounted in the mount 110.

A cap 160 is provided, mounted on the valve body 130. The cap 160 is formed from soft, resilient material, and forms an annular surround to the nozzle 80. When the nozzle 80 and valve 130 are in the retracted position, the free ends of the cap 160 do not engage with the mount 110. However, when the nozzle 80 and valve 130 are moved into the engaged position, the free annular end of the cap engages with the mount 110 in a region surrounding the capsule 1, and provides a seal between the nozzle 80 and the mount 110, so that no beverage dispensed from the nozzle 80 can exit from the apparatus 100 before it flows through the capsule 1.

In use, the tap 150 is rotated about a pivot to cause a cam surface to engage with the body of the valve 130, to which the nozzle 80 is attached, and push the valve 130 and nozzle 80 downwards, while also causing the valve 130 to open once the nozzle 80 has engaged with the piercing member 50 and caused the frangible portions 30, 40 of the capsule 1 to be broken, as described above in relation to the first embodiment. The tap 150 is sprung into the retracted position, so the nozzle 80 is biased away from the capsule 1 until the tap 150 is actuated. The tap 150 thus functions in a similar way to a conventional tap in a font, but additionally moves the nozzle 80 downwards to interact with the capsule 1 as described above.

In the present embodiment, the mount 110 is engaged with the apparatus 100 by rotating the handle relative to the apparatus 100 to engage pins (not shown) into grooves (not shown) in the apparatus 100. Disengagement and removal is then achieved by rotation in the opposite sense, disengagement of the pins from the respective grooves and removal of the mount 110, which can then be turned upside down to release the capsule 1 without directly touching it, and allow replacement with a new capsule 1 and then reengagement with the apparatus 100.

FIG. 5 shows an alternative embodiment of a dispensing apparatus 200. In this embodiment, a mount 210 is provided, having a handle and a cradle for receiving a capsule, which is as described above in relation to the dispensing apparatus of the previous embodiment. In this case, however, the engaging portion is not a nozzle of a beverage dispenser. Instead, the engaging portion is mounted on a second handle 220. The mount 210 and second handle 220 are pivotably mounted to one another and movable between an open position, in which a capsule can be placed in the cradle of the mount 210, and an engaged position, in which the engaging portion is brought into contact with the capsule, is pushed into engagement with the capsule as described above, and causes the frangible portions to be broken as discussed above. In this way, as the two handles are squeezed together, the contents of the capsule can be dispensed on their own, for example into a glass of beer, without dispensing a beverage through the capsule. Once the flavouring is dispensed, the two handles are separated, the capsule is removed from the cradle of the mount 210 as discussed above, which need not require physically touching the capsule, and a new capsule can then be placed in the cradle. As no parts of the apparatus downstream of the capsule come into contact with the flavouring as it is dispensed, cross-contamination can be minimised or avoided.

FIG. 6a shows a capsule 201 containing an alternative piercing member 250 according to a further embodiment of the invention. The rest of the capsule 201 is as described above in reference to the earlier embodiments. The capsule 201 of the present embodiment can be used in the dispensing apparatus 100 described above in relation to earlier embodiments. Therefore, only the piercing member 250 will be described in detail in this embodiment, the other features being the same as described previously.

In the present embodiment, the piercing member 250 has a generally "x" shaped cross-sectional profile as described above. Further, the piercing member 250 operates in the same manner as described above to open the capsule 201 at both the top and the base of capsule body on engagement with an engaging portion/nozzle (not shown) as described above. However, while in the previous embodiment, the flanking ribs 52 of the "x" extend by approximately the same amount along the axial length of the piercing member 50, in the present embodiment, while, as shown most clearly in FIG. 6b they maintain a tapered, swept back end, with an axially central point to pierce the base of the capsule, two of the four ribs 254' have their main body set back axially from the end, and have a narrower end portion 254a with sharply defined edges formed in the leading, tapered, edge of the ribs. Those two ribs 254' are thicker than the other two ribs, in the present embodiment approximately twice the width, while the end portion 254a is approximately the same width as the other two ribs 254. Further, the other two of the four ribs 254 have, at their radial outer surface, in the region of the tapered end, two flanges 254b, which extend away from the ribs substantially perpendicularly thereto in an axial direction on both sides of the ribs 254. In an alternative embodiment, all four ribs may be the same thickness, and all four may carry the flanges, rather than only two of the ribs.

In operation, as the second end of the piercing member 256 is engaged with the nozzle (not shown) as described above, the nozzle breaks the foil of the capsule 201. The second end 256 is also tapered from an axially central maximum extent as it extends out to the four ribs 254 so as to locate the nozzle. As the nozzle pushes the piercing member 250 down into the capsule 201, the end portions 254a pierce through the base of the capsule 201. The sharp edges of the end portions encourage the rupture of the base material of the capsule 201 along the whole length of the end portions 254a. The ends of the other ribs also rupture the capsule as discussed above with reference to the other embodiments. As the piercing member 250 continues to be pushed down into the capsule 201, the flanges 254b act to rupture the base of the capsule 201 in a region removed from the region broken by the end portions 254a and serve to widen the orifice created by the piercing member. In this way, fluid flowing through the capsule and out of the hole formed by the piercing member 250 can exit the capsule freely between the ribs, the extent of the hole being ensured by the flanges 254b to open the hole in a region away from the axial centre of the piercing member 250. Such a piercing member is particularly useful where the capsule 201 is made of a thick material, such as a composite or laminate material, for example aluminium and polypropylene laminated layers. It can also help to reduce "webbing", where part of the material of the capsule is held over the aperture formed by the piercing member so impeding fluid flow, by encouraging a clean peeling back of the capsule material.

Two of the ribs, which in the present embodiment are the two with the protruding narrow end portion 254a (but which could equally be the other two ribs) have a portion of low radial extent at the tapered end with the end portions 254a. The radial extent of these ribs increases away from the end at a portion part way along the axial length of the piercing member 250 towards the second axial end 256 of the piercing member 250. Where the radial extent increases, that extent is set so that the pair of opposing ribs approximately match or are slightly smaller than the internal diameter of the capsule 201 at a point where the first end 254 and the portions 254a, 254b are kept just in contact, or slightly out of contact with the base of the capsule 201. The radius of the ribs increases from the first end to the second end in this region approximately in the same way as the capsule 201 the piercing member 250 is mounted in.

The other two ribs 254 are formed in a similar way, but at their radial extent in the region where the radius increases between the first and second ends, resilient braces 258 are provided, which depend from and extend substantially axially toward the second end. These ribs 254 then decrease gradually in radial extent further towards the second end 256. These resilient braces 258 extend in rough conformance with the change of internal dimensions of the capsule. In this way, these portions of the ribs 257 and the braces 258 act to locate the piercing member 250 roughly centrally within the capsule 201, and act to bias the piercing member 250 into a position slightly away from the base of the capsule 201. The braces 258 then, due to their resilience, bend as the piercing member 250 is pushed into the capsule to pierce the base thereof to allow the movement of the piercing member within the capsule in response to that engagement with the nozzle, while resisting or preventing casual movement when dispensing is not desired.

Figure 7B:
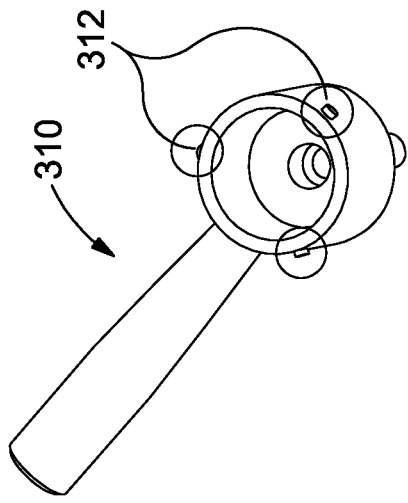
Figure 7C:
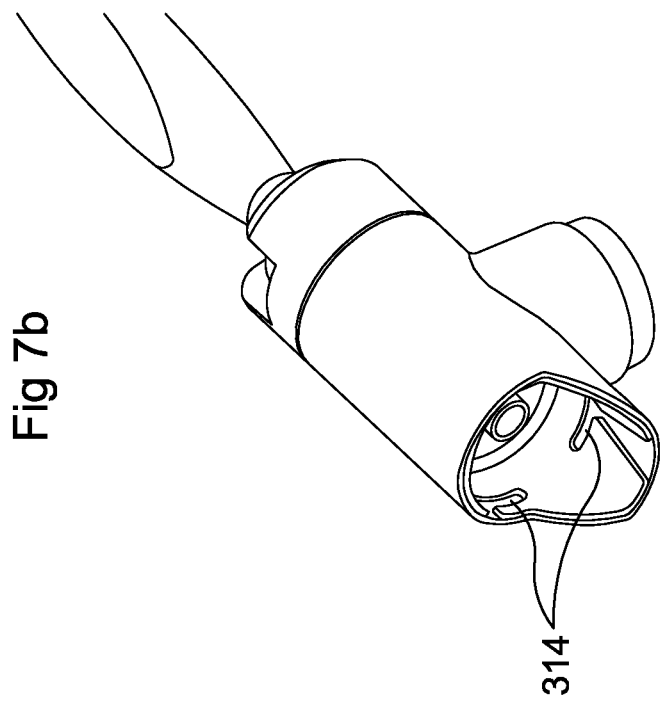
Figure 7A:
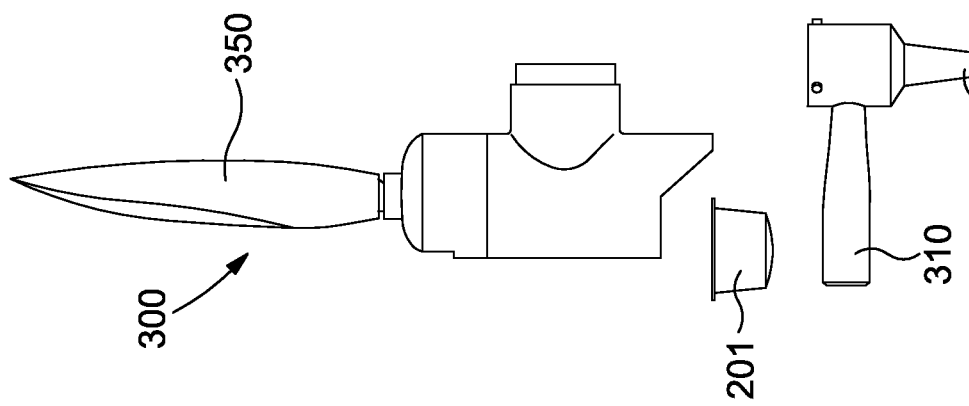

FIGS. 7 and 8 show a dispensing apparatus according to a further embodiment of the invention. This embodiment is similar to previous embodiments described above, and so only differences will be described in detail. The present embodiment differs from the embodiment shown in FIGS. 3 and 4 in that the dispensing outlet of the beverage flow is formed within the portafilter or mount rather than integrally within the tap. Further, the method of operation of the tap is different.

In detail, as shown in FIGS. 7 and 8, there is provided a dispensing apparatus 300. The apparatus 300 includes a mount 310 for receiving a capsule 1, 201, such as described above. The mount 310 has a cradle for receiving a capsule, and a handle for holding the mount when placing it in the apparatus 300. In the present embodiment, the dispensing outlet 320 is formed as part of the mount 310, rather than the main body of the dispensing apparatus 300. The mount 310 is releasably attached to the apparatus 300 by interengagement of radially projecting elements 312 on the mount 310 (in this embodiment, three being provided), which project radially outwardly and engage with respective grooves 314 which extend in a circumferential direction partly around an inner lower surface of the apparatus. One end of each groove is blind, while the other opens downwardly, so that the respective element 312 can be inserted into respective blind grooves 314. Rotation of the mount 310 relative to the apparatus causes the projections 312 to move along from the open ends of the respective blind grooves 314 to the closed ends, thus holding the mount 310 in place. In an embodiment, not shown, on the portafilter, a sprung ball or other detent which is biased radially outwardly is provided. A corresponding depression is provided at or adjacent the closed end of each blind groove 314, which provides a positive tactile sensation when the portafilter is rotated to engage the ball and corresponding depression. This also serves to retain the portafilter in the correct position.

FIGS. 8a to 8c show a section through a dispensing apparatus 300 and capsule 201 according to an embodiment of the invention. The operational sequence of the apparatus 300 is shown. In FIG. 8a, a dispensing handle 350 is shown, which rotates about a pivot point in order to operate. In the first few degrees of movement of the dispensing handle 350, a cam surface 305 abuts the top of a nozzle body 385, to the bottom of which the nozzle 380 is mounted. The cam surface 305 pushes the nozzle body 285 and therefore the nozzle 380 downwards and the capsule 201 is pierced at the top and the bottom by cooperation of the piercing member 250 of the capsule 201 as the nozzle 380 moves downwardly towards and into the top of the capsule 201 and engages with the piercing member 250 as described above. The dispensing handle 350 is connected to a valve body 335, which comprises a valve 330 releasably sealing a flow channel between an internal chamber in the nozzle body 385 and the nozzle itself 380. The valve 330 is biased to close the flow channel between the hollow interior of the nozzle body 385 and nozzle 380 by a spring. The valve body 335 is mounted in the interior of nozzle body 385, and connected to the dispensing handle 350 via a groove 390 on the valve body 335 and an engaging pin 395 on the handle 350, which pin 395 is slidably mounted in the groove 390. In the first few degrees of rotation of the dispensing handle 350 from a closed position, the pin 395 slides up the groove 390, so that, while the nozzle body 385 moves downwardly, the groove 390 allows the valve body 335 to move downwardly with the nozzle body 385 as the pin 395 rides up the groove 390. The nozzle 380 contacts the capsule 201, breaks the lid and engages with the piercing member 250 and pushes the piercing member through the base of the capsule 201.

In FIG. 8b, continuing rotation of the dispensing handle 350 causes the cam 205 to further push the nozzle body 385 downwards, which bring a cap 360, which is mounted on the nozzle body 385 around the nozzle 380 into contact with the capsule 201, and which seals around the capsule 201 to provide a closed space between the top of the capsule 201 and the nozzle 380. The nozzle 380 also moves further down, pushing the piercing member 250 further through the capsule 201, so further opening the frangible region of the capsule 201 on the far side of the capsule 201 to the nozzle 380. The valve body 335 continues to move down with the nozzle body 385 until the pin 395 reaches the top of the groove 390, as shown in FIG. 8b. The valve 330 therefore remains in contact with the nozzle 380, and no fluid flow occurs. This ensures that a seal is made before the beverage is dispensed through the capsule 201, to avoid spillage of the beverage.

Finally, in FIG. 8c, further rotation of the dispensing handle 350 causes the nozzle body 385 to move downwards further. As the pin 395 has reached the end of travel in the groove 390, this further movement of the nozzle body 385 is not mirrored by the valve body 335. Instead, the pin 395 and groove 390 engage and cause the valve body to stop its downward movement, and against the biasing force of the spring acting between the valve body 335 and nozzle body 385 the valve 330 opens to allow fluid flow from the inside of the nozzle body 385 to the nozzle 380. The fluid flows out of the nozzle, through the capsule, and is then dispensed out of the dispensing outlet 320 in the mount 310. The dispensing of beverage flushes through the capsule 201 and ensures that all the flavouring is dispensed, while ensuring smooth flow and minimal foaming.

Closing the tap occurs in the opposing sequence to that described above.

The embodiments disclosed above have been described purely by way of example, and various modifications, omissions and changes may be made without departing from the scope and spirit of the invention, such modifications, omissions and changes also forming part of the invention described herein. Unless the context clearly requires to the contrary, the terms "comprise", "comprises", "comprising" and the like are to be interpreted in the inclusive rather than exhaustive sense, i.e. in the sense of "including but not limited to".

REFERENCE NUMERALS capsule 1, 201
flavouring 10
closed internal volume 20
first frangible region 30
second frangible region 40
piercing member 50, 250
ribs 52, 252, 252'
ends 54, 56, 254a, 254b, 256
braces 58, 258
base 60
lid 70
nozzle 80 dispensing apparatus 100, 300
mount 110, 310
outlet 120, 320
valve/valve body 130, 330
inlet port 140
tap 150, 350
cap 160, 360
apparatus 200
mount 210
second handle 220
handle cam surface 305
radially extending elements 312
grooves 314
valve body 335
nozzle body 385
valve body groove 390
handle pin 395

The invention claimed is:

1. A capsule for delivering flavoring to a beverage, the capsule defining a closed internal volume containing a flavoring for the beverage, the capsule comprising:
   a piercing member housed within the closed internal volume of the capsule, wherein opposing ends of the piercing member are pointed;
   a body defining a blind recess and comprising a first frangible region;
   a lid comprising a second frangible region, the body and the lid together defining the closed internal volume containing flavoring for the beverage; and
   wherein the piercing member is configured to pierce the first frangible region of the body, and wherein the piercing member is configured to pierce the second frangible region of the lid.

2. The capsule according to claim 1, wherein the piercing member is elongate and the opposing ends are configured to pierce the lid and the body respectively.

3. The capsule according to claim 1, wherein the piercing member, in cross section, defines regions of relatively larger and reduced radial extent.

4. The capsule according to claim 1, wherein the piercing member comprises a central elongate core, and a plurality of ribs extending therefrom along at least part of the length of the central elongate core.

5. The capsule according to claim 4, wherein the ribs extend substantially radially away from the central elongate core.

6. The capsule according to claim 1, wherein the piercing member has a substantially x-shaped cross section.

7. The capsule according to claim 1, wherein the piercing member comprises a plurality of locating braces, and wherein at least some of the locating braces extend laterally from the elongate direction of the piercing member, and retain the piercing member in position inside the capsule with the opposing ends adjacent the first and the second frangible regions of the capsule.

8. The capsule according to claim 1, wherein an end of the piercing member comprises one or more flanges for enlarging a hole formed by the piercing member on piercing of the frangible region of the capsule.

9. The capsule according to claim 1, wherein the piercing member is formed as a separate part, and is not attached to the remainder of the capsule.

10. A dispensing apparatus comprising:
    a mount for receiving the capsule according to claim 1, containing the flavoring to be added to the beverage; and
    an engaging portion configured to engage with the piercing member positioned within the capsule and pierce the first and/or the second frangible region of the capsule,
    wherein the dispensing apparatus is configured to provide relative movement of the mount and the engaging portion between a retracted position and an engaged position in which the engaging portion is configured to engage with the piercing member in the capsule.

11. The dispensing apparatus according to claim 10, the dispensing apparatus being configured to be retrofittable to an existing beverage dispensing unit.

12. The dispensing apparatus as claimed in claim 10, wherein the engaging portion is a beverage dispensing nozzle.

13. The dispensing apparatus as claimed in claim 10, wherein the engaging portion is movable relative to the dispensing apparatus.

14. The dispensing apparatus as claimed in claim 10, wherein the dispensing apparatus comprises a tap operable to both open a valve and move the engaging portion to engage with the piercing member in the capsule mounted in the mount.

15. The dispensing apparatus as claimed in claim 10, wherein the mount is removable from the dispensing apparatus.

16. The dispensing apparatus as claimed in claim 10, wherein the mount comprises a through hole, which is restricted at one end to retain the capsule within the through hole, while allowing beverage to flow there through.

* * * * *